United States Patent [19]

Carlisi

[11] Patent Number: 5,048,465
[45] Date of Patent: Sep. 17, 1991

[54] SELF-CLEANING KITTY LITTER BOX

[76] Inventor: Angelo Carlisi, 759 Central Dr., Lake Orion, Mich. 48362

[21] Appl. No.: 639,277

[22] Filed: Jan. 10, 1991

[51] Int. Cl.⁵ .............................................. A01K 1/01
[52] U.S. Cl. .................................... 119/166; 119/161; 209/235
[58] Field of Search ................................ 119/161–170; 209/616, 235, 374, 260, 365.1, 373, 252

[56] References Cited

U.S. PATENT DOCUMENTS

| | | | |
|---|---|---|---|
| 4,190,525 | 2/1980 | Menzel | 209/235 |
| 4,574,735 | 3/1986 | Hohenstein | 119/161 |
| 4,846,104 | 7/1989 | Pierson | 209/235 |
| 4,854,267 | 8/1989 | Morrow | 119/161 |
| 4,934,317 | 6/1990 | Pourshalchi | 119/165 |

FOREIGN PATENT DOCUMENTS 297015 12/1988 European Pat. Off. ............ 119/166

Primary Examiner—John G. Weiss
Attorney, Agent, or Firm—Brooks & Kushman

[57] ABSTRACT

A self-cleaning kitty litter box and method for cleaning the litter box are disclosed. The kitty litter box has a removable pan in which kitty litter is placed. A motor and timing device are provided for periodically moving a rake through the kitty litter so to push solid waste to one end of the pan. The rake is then rotated in contact with a stop out of the pan, the rake then moves forward and drops the collected solid waste into a storage tray. The motor and timer allow this process to be periodically repeated without involvement of the cat owner until ultimate disposal of the cat waste is desired.

14 Claims, 3 Drawing Sheets

SELF-CLEANING KITTY LITTER BOX

TECHNICAL FIELD

This invention relates to the cleaning of solid waste from kitty litter boxes, particularly with respect to an automatic device and method for accomplishing such cleaning.

BACKGROUND ART

With cats now becoming the most popular type of domestic pet, the use of kitty litter boxes continues to increase. Such a box is normally made of plastic or similar material so that the cat's urine will not leak through. The box has placed in it one of any number of particulate litter material meant to absorb moisture and odor from the cat's waste. These materials are generally referred to as kitty litter. The cats also will generally bury their solid waste in the kitty litter.

General practice for most cat owners is to discard the kitty litter after an extended period of time. However, before the kitty litter has reached a state where it need be totally dumped, it is often necessary to periodically remove the solid waste to prevent it from being kicked out of the box by the cat upon subsequent visits to the kitty litter box.

Many cat owners find this task of manually searching the kitty litter for the solid waste to be obnoxious. Thus, inventors have periodically sought to devise ways of cleaning the solid waste automatically. Patents showing devices for cleaning litter boxes include U.S. Pat. Nos. 4,096,827; 4,117,804; 4,190,525; 4,325,325; and 4,325,822. However, no non-manual method of cleaning kitty litter boxes has gained widespread acceptance.

SUMMARY OF THE INVENTION

An object of the present invention is to provide an automatic self-cleaning kitty litter box which will clean solid waste from the kitty litter while not requiring the cat owner to be present during the cleaning process.

A further object of the invention is to provide a substantially closed holding container for the solid waste after it is cleaned from the kitty litter prior to its disposable.

An advantage of the present invention is that the solid waste in the holding container will be separated from moisture sometimes found in the area where the cat relieves itself, thereby cutting down on the odor from the solid waste.

Accordingly, the self-cleaning kitty litter box is provided which includes an area for holding kitty litter and a rake which passes through the kitty litter holding area. The rake interacts with means on the kitty litter box housing so to rotate the tines of the rake along an arcuate upwardly extending portion until the rake passes beyond the area for holding kitty litter. The means are then provided for dropping the kitty litter outside the area holding the kitty litter.

Preferably, the rake is driven by a motor connected to the rake by worm gear assembly and the motor is controlled by a timing device so it runs periodically.

A method for cleaning the kitty litter box includes the steps of moving a rake through the kitty litter holder to collect solid waste, abutting a portion of the rake so to rotate the rake out of the kitty litter, then dumping the solid waste collected on the rake outside the kitty litter holder, preferably into a separate holder. The method also preferably includes a motor for periodically performing these steps. The method may also feature opening of a cover for the second holder.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 2:
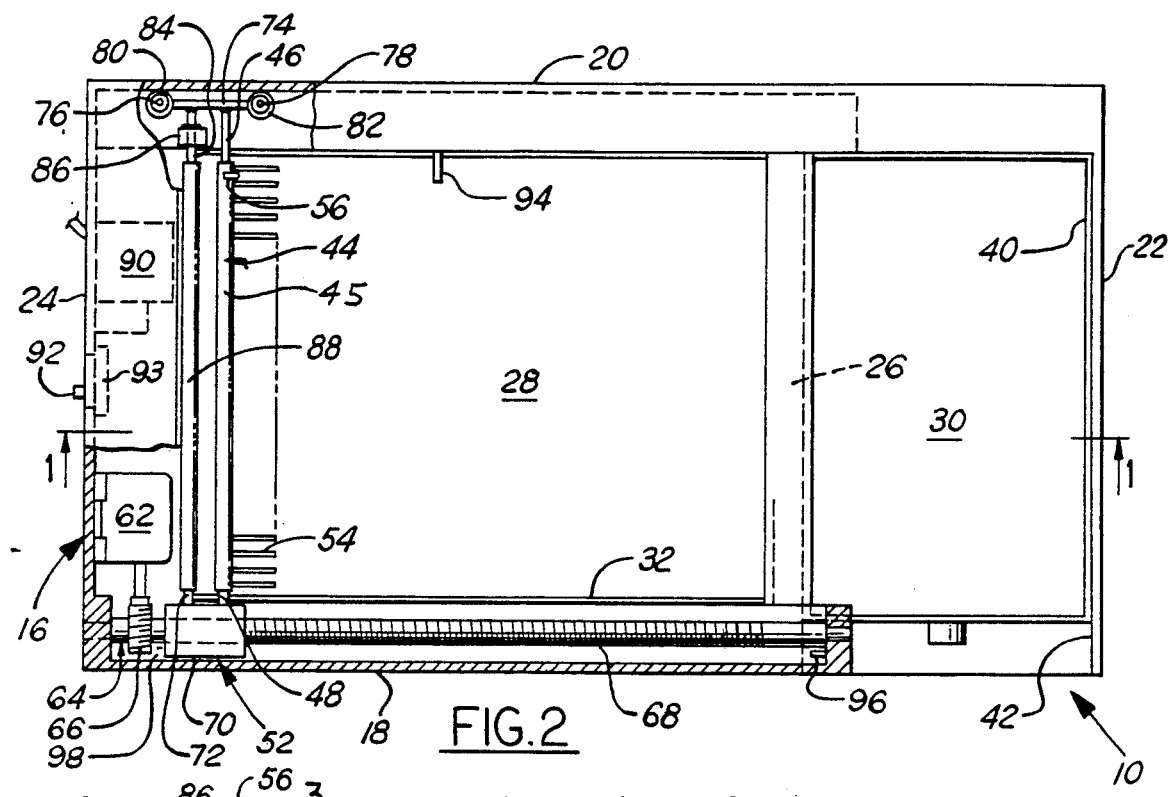
FIG. 2 is a top view of the kitty litter box of FIG. 1.

The kitty litter box 10 of the present invention is designed to provide an automatic means of cleaning solid waste 12 which has been mixed in and buried by the cat in the kitty litter 14 placed within the kitty litter box.

The kitty litter box 10 features a housing 16. The housing has two side walls 18 and 20, a front wall 22 and rear wall 24. The housing features a dividing wall 26 between the two compartments 28 and 30.

The first compartment 28 of the housing is defined by rear wall 16, dividing wall 26 and the side walls and allows for placement within it of a kitty litter holding pan or holder 32. This pan is preferably of a water-proof durable plastic-type material. The pan, when placed within housing 28, is filled to suitable level with clean kitty litter 14 to allow a place in which the cat can relieve itself. The pan is of such a size to extend from side wall to side wall. The front end of the pan has a lip 34 designed to overhang dividing wall 26 and has a ramp 36 extending rearwardly from the lip having an arcuate cross-section as will be defined more fully below. The rear end of the pan should be shaped to provide for a motor compartment 38 and may be a mirror image of the front end to allow the pan to be reversible.

The second chamber 30 of the housing defines a refuse area and is designed to maintain a solid waste storage and disposal tray or holder 40, preferably in the form of a drawer, clear of moisture that may be found in the first compartment. The tray is open on the top for receipt of the solid waste as will be described below. An opening 42 is made in one of the side walls of the housing to allow for easy placement and removal of the tray.

Figure 5:
FIG. 5 is a cross-sectional view of one of the tines.
Figure 6A:
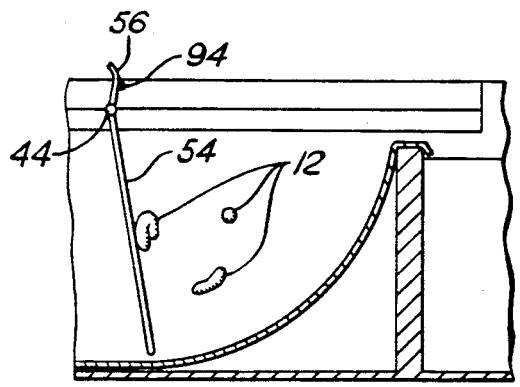
FIGS. 6A through 6E are sequential partial views illustrating how the solid waste is cleaned from the kitty litter box.
Figure 6B:
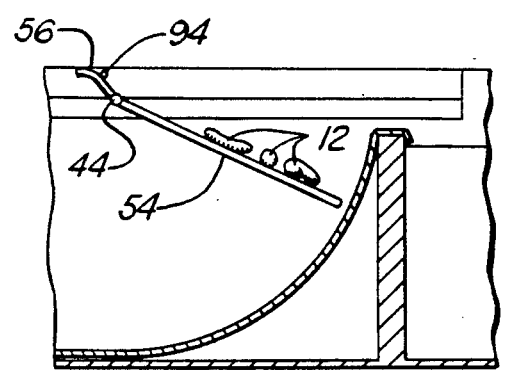
Figure 6C:
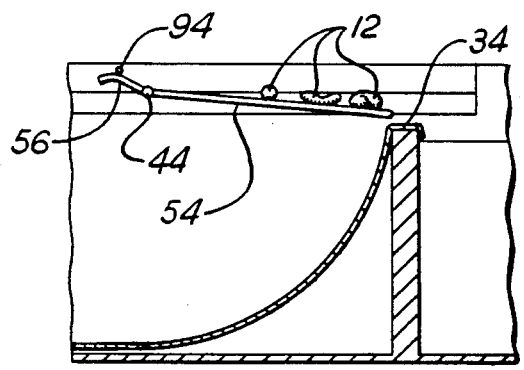
Figure 6D:
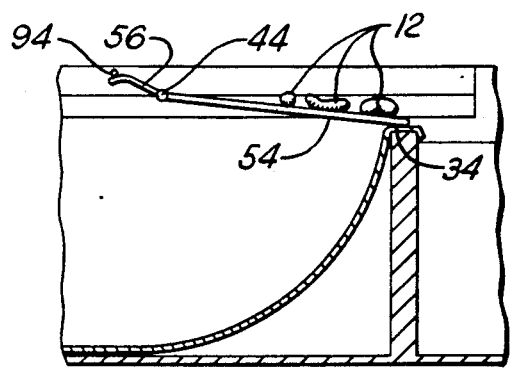
Figure 6E:
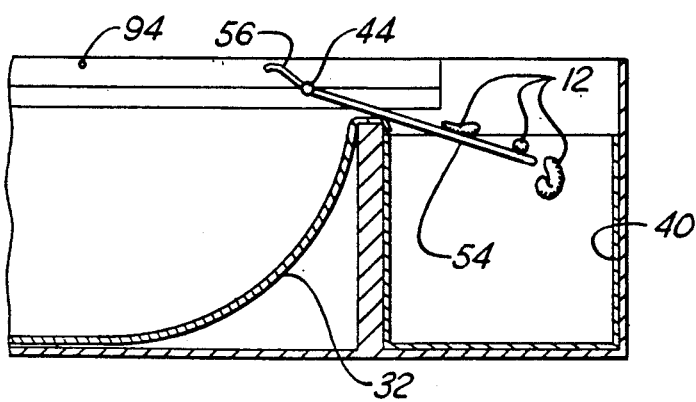

Extending between the side walls is a rotatable rake 44 which includes a tubular rake member 45. The rake 44 pivots on pins 46,48 which are parts of carriers 50 and 52, respectively, positioned within the side walls. Extending downward from the rake member 45 are a series of tines 54 designed for clearing solid waste from the kitty litter and allowing for the passage of the kitty litter between the tines. The preferable distance between the tines is ⅜ of an inch. These tines preferably have a tear-shaped cross-section such as shown in FIG. 5. The length of the tines should be greater than the distance from the carrier pins 46,52 to the bottom of the pan 32 so that the tines will normally maintain a downward and forward slope. Extending upwardly and forwardly from the carrier member is control member, such as pin 56. The top of pin 56 is curved rearwardly. Cavities 58,60 are made in the side walls to allow passage of carriers 50 and 52, respectively, through the side walls. In the preferred embodiment, carrier 52 is an active carrier including means for driving the rake through the kitty litter. Carrier 50, on the other hand, is a passive carrier designed to merely maintain the rake in a suitable position as it moves through the kitty litter.

The present invention can be used in a manual fashion where the rake member is moved manually, in which case, both carriers should be of a passive design. Alternatively, both carriers may be of the driven design for extra power.

The openings to the cavities through which the carrier pass may be covered by a rubber vail 61 attached over the openings to prevent entry of kitty litter into the cavities with a slit 63 in it and allow passage of pins 46, 48, 72 and 84.

The active carrier 52 is driven by motor 62 by means of a worm gear assembly 64. Worm gear assembly 64 consists of worm gear 66 driven by motor 62 and worm 68 upon which active carrier 52 moves. The active carrier 52 is comprised of a traveller member 70 from which extends a pair of pins 48 and 72.

Figure 1:
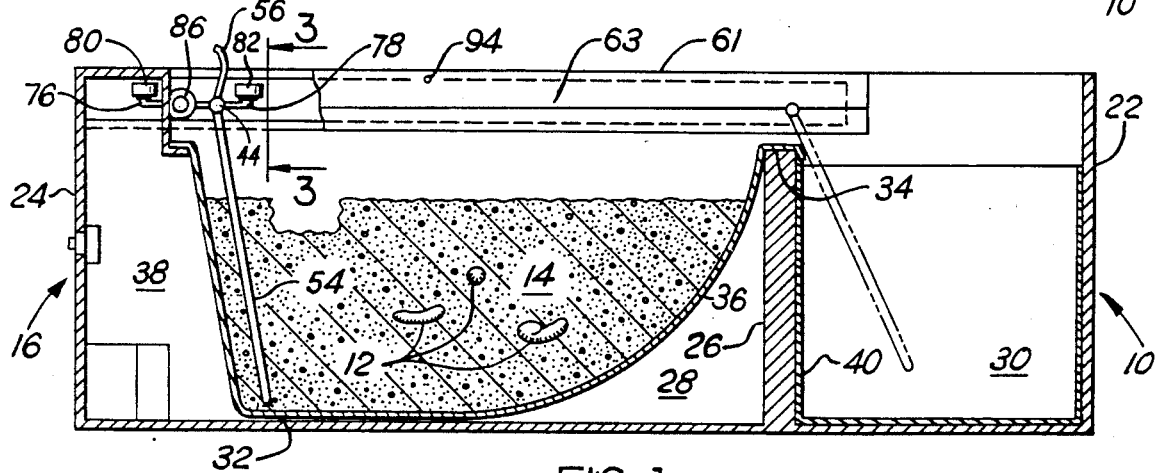
FIG. 1 is a cross-sectional side view illustrating the kitty litter box of the present invention taken along line 1—1 of FIG. 2.
Figure 3:
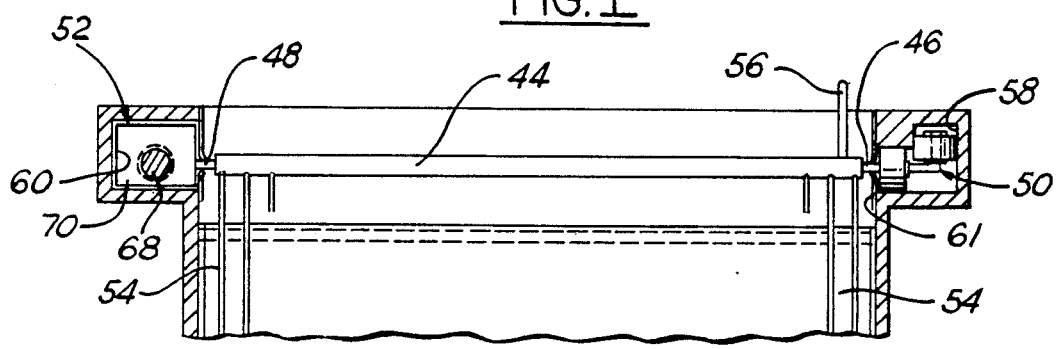
FIG. 3 is a partial view taken along line 3—3 of FIG. 1.
Figure 4:
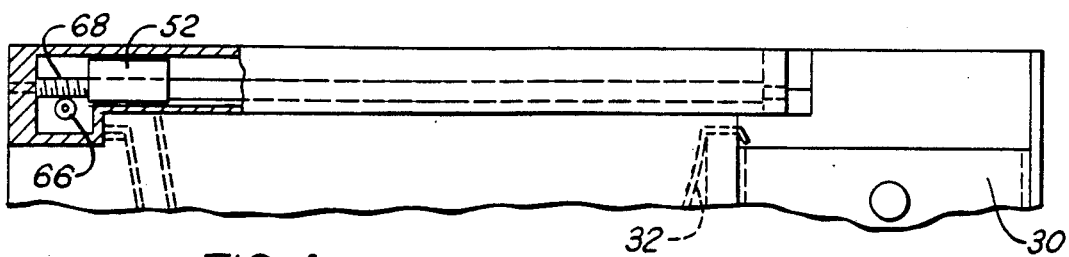
FIG. 4 is a partial cut-away side view of the kitty litter box.

The passive carrier 50 is best shown in FIGS. 1 and 2. It comprises a central pin 74 out of the ends of which extend upward short axle members 76,78 upon which are placed rollers 80 and 82. These rollers travel within the side wall 20 to prevent lateral binding of the carrier within the side wall. Extending inwardly from the central pin are a pair of pins 46 and 84 upon one of which is placed roller 86 to prevent horizontal binding of the carrier within the side wall.

A spacing bar 88 is rigidly joined to pins 84 and 72. (If manual operation is to be used with a pair of passive carriers, a suitable knob (not shown), may be added to arm 88 so to allow easy movement of the arm and carriers and in turn, the rake).

In operation, a suitable source of power 90 is provided to the motor 62. An on/off switch 92 is provided for actuation of the cleaning process. Alternatively or additionally, the process may be started by some predetermined conditions. Preferably, the process may be started by means of a timer mechanism 93 designed to start the cleaning process daily at a time in which the cat would not normally be using the kitty litter box. The drive may also be intermittent to allow easier movement through the kitty litter.

Once the motor is started, worm gear 66 will drive worm 68 so that the active carrier will move forward along the worm carrying with it rake 44. The tines 54 of the rake will be pulled through the kitty litter collecting any solid waste that may have accumulated and driving the solid waste before the tines. After the tines have been driven forward a suitable distance, control pin 56 will contact stop 94 which is a pin extending inwardly from the side wall into the path of the control pin. Once this contact has been made, control pin 56 will be prevented from moving forward resulting in rotation of the rake member 44 around pins 46,48. This in turn, will cause the tines to rotate upwardly as they continue to move forward. This process is shown in FIG. 6.

As the active carrier continues to move forward, the rotation process will continue with the ends of the tines moving in an arc. The arcuate surface 36 is shaped to have a similar arcuate cross-section so the tines are only slightly distanced from the tray. This distance is preferably less than ⅜ of an inch. The tines thereby move the solid waste out of the kitty litter. At a point shown in FIG. 6C, the tines will have been raised above lip 34 of the pan. Thereafter, pin 56 will clear under stop 94. The tines will be prevented from moving downward, however, due to their resting upon lip 34. Forward movement will continue until the tines will have substantially cleared lip 34 at which time they will tilt forward, dropping the solid waste into the disposal tray 40. At this point, the traveller 70 will contact a limit switch 96 which will cause the motor to reverse itself until the carrier/rake assembly to move to its initial position and a second limit switch 98 which will turn off the motor. On the return trip, the tines will have a tendency to stay on top of the kitty litter, but when the cleaning process is started again, the downward slope on the tines will urge it to dig into the kitty litter so as to collect the solid waste. This process is aided by the teardrop shape of the tines. The rearwardly curved portion of pin 56 prevents the pin from hanging up on stop 94 during the return travel.

As can be seen from the above process, if the kitty litter box cleaning mechanism is on a timer, it is unnecessary for the cat owner to visit the kitty litter box for an extended period of time. Ideally, no trip will be needed until such time as the kitty litter itself needs to be changed, at which point pan 32 can be lifted out of the housing and the used kitty litter dumped. Tray 40 will also then be slid out of the housing and the solid waste dumped. Both the pan and tray can be separately cleaned. This process will remove one of the more obnoxious parts involved in owning a cat.

Figure 7:
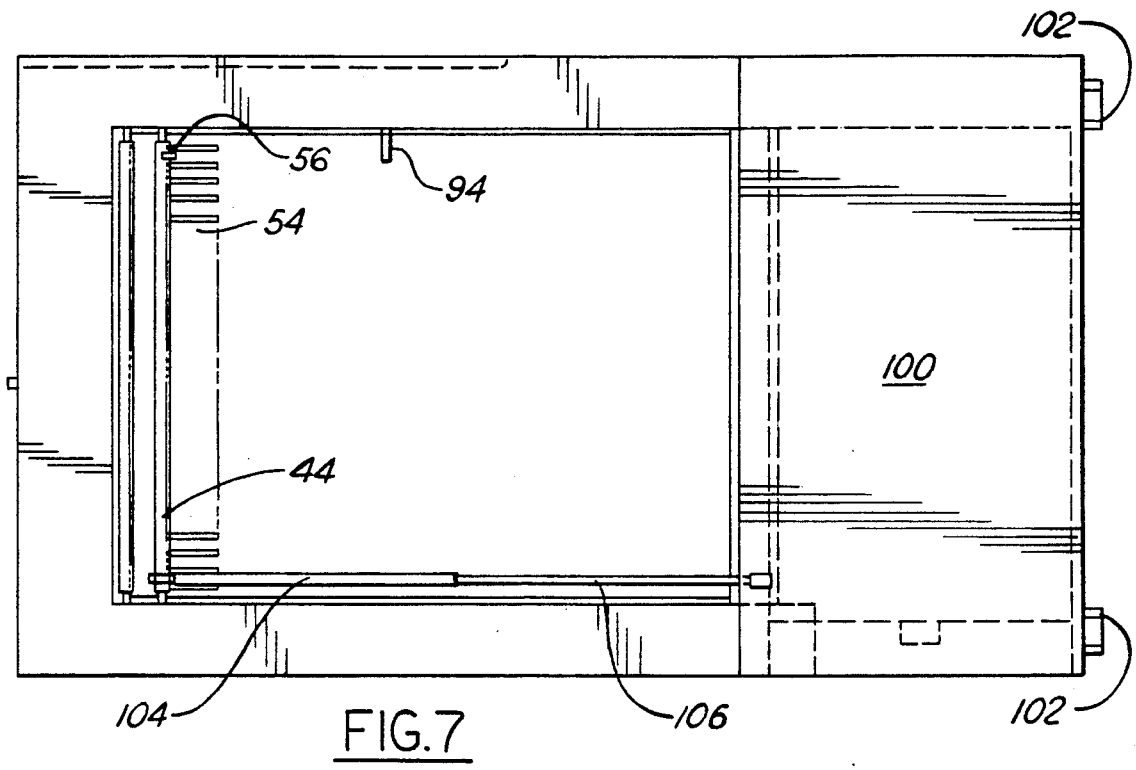
FIG. 7 is an alternative embodiment of a portion of the kitty litter box showing a means for automatically opening a lid on the refuse area of the kitty litter box.
Figure 8:
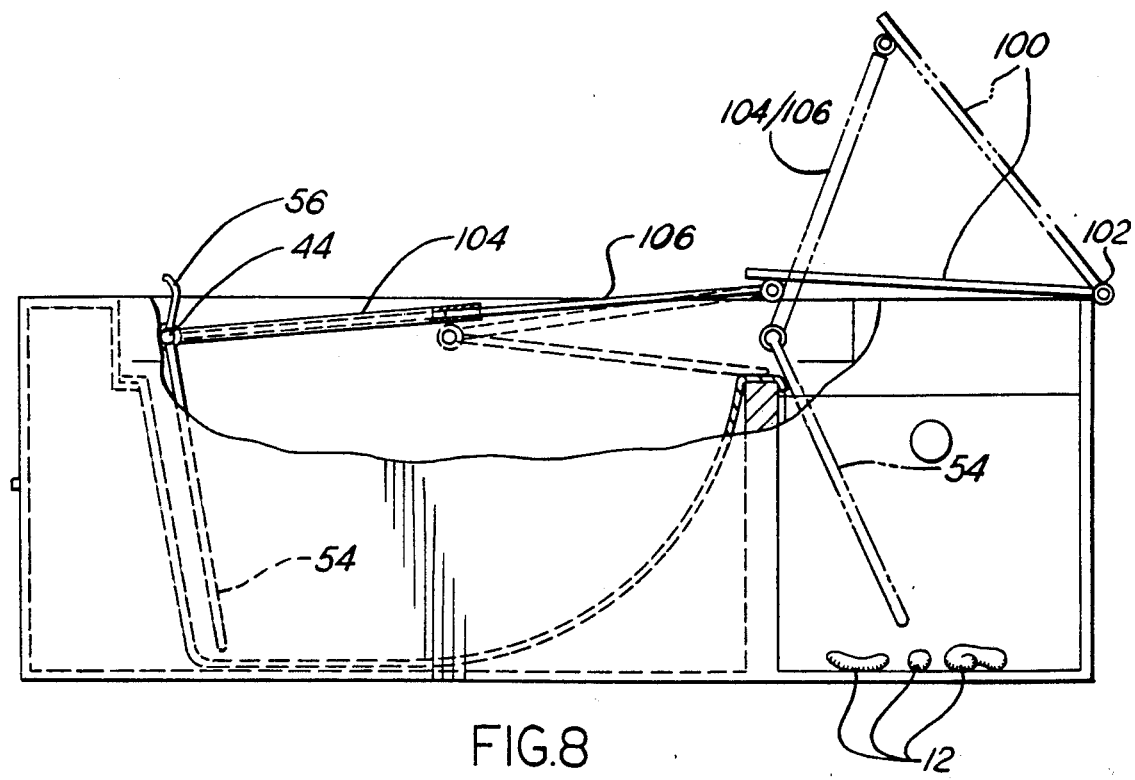
FIG. 8 is a side view of the opening mechanism of FIG. 7.

Also provided, as shown in FIGS. 7 and 8, is a top to the compartment containing the solid waste storage tray. This may take the form of a cover 100 hinged by suitable means 102 to the front wall 22 of the housing. The rearward end of the cover is attached to a telescoping opener comprised of two members 104, 106. Member 104 is pivotally joined to the rake member 44. One end of link member 106 extends into member 104. The other end of link member 106 is pivotably joined to a cover 100. As the carriers and rake move forward during the cleaning process, member 106 will slide into member 104 until it is fully retracted. Further forward movement of the rake will cause link members 104 and 106 to pivot cover 100 open as solid waste is dumped into tray 40. As the process is reversed members 104 and 106 will return to their original positions with cover 100 closed.

While the best mode for carrying out the invention has been described in detail, those familiar with the art to which this invention relates will recognize various alternative designs and embodiments for practicing the invention as defined by the following claims.

What is claimed is:

1. A self-cleaning kitty litter box comprising:
   a housing including an area for holding kitty litter said area having at one end an arcuate upwardly extending portion and a lip;

a rake including a plurality of pivotable tines movable laterally along the housing through the area for holding kitty litter;

means interacting with the rake as it approaches said end so as to rotate the tines along said arcuate upwardly extending portion until the rake passes beyond the area for holding kitty litter as lateral movement of the rake continues; and dropping means located beyond said arcuate upwardly extending portion of the area for holding kitty litter interacting with the rake so to allow any solid waste collected by the tines as they pass through the area for holding kitty litter to be dropped outside the area for holding kitty litter.

2. The kitty litter container of claim 1 further comprising means for automatically moving said rake from a first lateral starting position to a second lateral dropping position and then back to said first position.

3. The kitty litter container of claim 2 wherein the automatic moving means comprises a motor driven worm gear assembly wherein the rake is operably joined to the worm by a traveller member.

4. The kitty litter container of claim 1 further comprising a timing device for controlling the means for automatically moving said rake so that the automatic movement means will periodically move said rake from the first lateral starting position to the second lateral dropping position and back to the first position.

5. The kitty litter container of claim 1 further comprising a stop joined to the housing and in the path of said control member;

wherein the rake further comprises a control member having a fixed angular relationship with said tines and said means interacting with the rake;

said control member rotatably abutting said stop so that as the control member is rotatably moved around the stop as lateral movement continues the tines rotate along said arcuate upwardly extending portion until the rake passes beyond the area for holding kitty litter.

6. The kitty litter container of claim 1 wherein the housing includes an area for placement of a removable solid waste storage tray into which the solid waste is dropped upon interaction of the dropping means and the rake.

7. The kitty litter container of claim 6 wherein the cover is provided above the removable tray which is normally substantially closed and providing means interacting with said rake to open the cover as solid wastes being dropped into the tray.

8. The kitty litter container of claim 7 wherein said means for opening the cover comprises a linkage abutted by a portion of said rake.

9. A method for cleaning solid waste from kitty litter comprising the steps of:

moving a rake laterally through kitty litter in a holder so as to collect solid waste in the kitty litter;

abutting a portion of said rake so as to rotate the rake out of the kitty litter while lateral movement continues maintaining any collected solid waste on the rake until the rake clears the holder;

further moving the rake laterally so as to result in the dumping of the solid waste outside the kitty litter holder.

10. The method of claim 9 wherein the solid waste is dumped into a separate second holder.

11. The method of claim 10 further comprising the step of abutting a cover mechanism during said lateral movement of the rake so as to open a cover over said second holder.

12. The method of claim 9 further comprising the step of providing a motor for moving the rake laterally; and controlling the motor by means of a timing device so that the moving, abutting, and further moving steps are repeated at predesignated times.

13. A self-cleaning kitty litter box comprising a housing including a first area for holding a pan into which kitty litter is to be held, said housing having laterally extending side walls;

a motor going to the housing connected to a worm gear for driving a worm;

a rake joined to a pair of carriers which move laterally within the side walls, said rake including a plurality of generally downwardly and forwardly extending tines and an upwardly extending abutment;

one of said carriers including a traveler movable by said worm to cause the lateral movement of the carrier;

a stop joined to the housing on one of said side walls so to interact with the rake abutment and move the tines upwardly out of the pan and then allowing downward movement of the tines into the tray beyond the pan.

14. The self-cleaning kitty litter box of claim 13 further comprising a cover hinged to the housing and linkage means for controlling the opening of the cover and wherein the rake has a second abutment means which when contacting the linkage during lateral movement of the rake will open the cover.

* * * * *